United States Patent
Sha et al.

(10) Patent No.: US 9,311,085 B2
(45) Date of Patent: Apr. 12, 2016

(54) COMPILER ASSISTED LOW POWER AND HIGH PERFORMANCE LOAD HANDLING BASED ON LOAD TYPES

(75) Inventors: Tingting Sha, Hillsboro, OR (US); Chris Wilkerson, Portland, OR (US); Herbert Hum, Portland, OR (US); Alaa R. Alameldeen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 11/967,230

(22) Filed: Dec. 30, 2007

(65) Prior Publication Data

US 2011/0161632 A1 Jun. 30, 2011

(51) Int. Cl.
  *G06F 9/312* (2006.01)
  *G06F 9/30* (2006.01)
  *G06F 9/45* (2006.01)
  *G06F 9/38* (2006.01)

(52) U.S. Cl.
  CPC .......... *G06F 9/30043* (2013.01); *G06F 8/4442* (2013.01); *G06F 9/30047* (2013.01); *G06F 9/30185* (2013.01); *G06F 9/3826* (2013.01); *G06F 9/3891* (2013.01); *G06F 8/41* (2013.01)

(58) Field of Classification Search
  None
  See application file for complete search history.

(56) References Cited

U.S. PATENT DOCUMENTS

| | | | | |
|---|---|---|---|---|
| 5,701,435 A | * | 12/1997 | Chi | 711/159 |
| 5,790,823 A | * | 8/1998 | Puzak et al. | 712/207 |
| 5,829,025 A | * | 10/1998 | Mittal | 711/122 |
| 5,919,256 A | * | 7/1999 | Widigen et al. | 712/218 |
| 6,014,735 A | * | 1/2000 | Chennupaty et al. | 712/210 |
| 6,122,708 A | * | 9/2000 | Faraboschi et al. | 711/118 |
| 6,141,733 A | * | 10/2000 | Arimilli et al. | 711/141 |
| 6,317,810 B1 | * | 11/2001 | Lopez-Aguado et al. | 711/120 |
| 6,643,762 B1 | * | 11/2003 | Arnold et al. | 712/1 |
| 6,665,792 B1 | * | 12/2003 | Merchant et al. | 712/219 |
| 6,986,027 B2 | * | 1/2006 | Barowski et al. | 712/240 |
| 2002/0144062 A1 | * | 10/2002 | Nakamura | 711/137 |
| 2004/0049639 A1 | * | 3/2004 | So et al. | 711/137 |
| 2004/0268050 A1 | * | 12/2004 | Cai et al. | 711/137 |
| 2005/0149521 A1 | * | 7/2005 | Wang et al. | 707/6 |
| 2007/0204108 A1 | * | 8/2007 | Griswell et al. | 711/137 |
| 2009/0077350 A1 | * | 3/2009 | Saraswati et al. | 712/207 |
| 2009/0198903 A1 | * | 8/2009 | Arimilli et al. | 711/137 |
| 2011/0154002 A1 | * | 6/2011 | Liu et al. | 712/234 |

OTHER PUBLICATIONS

Reinman et al. (Classifying Load and Store Instructions for Memory Renaming); ICS '99 Proceedings of the 13th international conference on Supercomputing; pp. 399-407.*

Sanchez et al. (A Locality Sensitive Multi-Module Cache with Explicit Management); Proceeding—ICS '99 Proceedings of the 13th international conference on Supercomputing; pp. 51-59.*

(Continued)

*Primary Examiner* — Keith Vicary

(74) *Attorney, Agent, or Firm* — Trop, Pruner & Hu, P.C.

(57) ABSTRACT

A method and apparatus for handling low power and high performance loads is herein described. Software, such as a compiler, is utilized to identify producer loads, consumer reuse loads, and consumer forwarded loads. Based on the identification by software, hardware is able to direct performance of the load directly to a load value buffer, a store buffer, or a data cache. As a result, accesses to cache are reduced, through direct loading from load and store buffers, without sacrificing load performance.

7 Claims, 3 Drawing Sheets

(56) References Cited

OTHER PUBLICATIONS

Tyson et al. (Improving the Accuracy and Performance of Memory Communication Through Renaming); This paper appears in: Microarchitecture, 1997. Proceedings., Thirtieth Annual IEEE/ACM International Symposium on; Issue Date: Dec. 1-3, 1997; on pp. 218-227.*

Ortega et al. (Cost-Effective Compiler Directed Memory Prefetching and Bypassing); pact, pp. 189, 11th International Conference on Parallel Architectures and Compilation Techniques (PACT'02), 2002; 10 pages.*

Chi et al. (Reducing Data Access Penalty Using Intelligent Opcode-Driven Cache Prefetching); This paper appears in: Computer Design: VLSI in Computers and Processors, 1995. ICCD '95. Proceedings., 1995 IEEE International Conference on; Issue Date: Oct. 2-4, 1995; on pp. 512-517.*

Wang et al. (Highly Accurate Data Value Prediction using Hybrid Predictors); micro, pp. 281-290, 30th Annual IEEE/ACM International Symposium on Microarchitecture (MICRO'97), 1997.*

Wang et al. (Guided Region Prefetching: A Cooperative Hardware/Software Approach); isca, pp. 388, 30th Annual International Symposium on Computer Architecture (ISCA'03), 2003; 11 pages.*

Zhao et al. (Static Classification of Value Predictability Using Compiler Hints); IEEE Transactions on Computers, vol. 53, No. 8, pp. 929-944, Aug. 2004, doi:10.1109/TC.2004.49.*

Burtscher et al. (Static Load Classification for Improving the Value Predictability of Data-Cache Misses); Proceeding—PLDI '02 Proceedings of the ACM SIGPLAN 2002 Conference on Programming language design and implementation; p. 222-233.*

Jouppi (Improving Direct-Mapped Cache Performance by the Addition of a Small Fully-Associative Cache and Prefetch Buffers); This paper appears in: Computer Architecture, 1990. Proceedings., 17th Annual International Symposium on; Issue Date: May 28-31, 1990; on pp. 364-373.*

Zucker et al. (A Comparison of Hardware Prefetching Techniques for Multimedia Benchmarks); pp. 236-234, 1996 International Conference on Multimedia Computing and Systems (ICMCS'96), 1996.*

Palacharla et al. (Evaluating Stream Buffers as a Secondary Cache Replacement); ISCA '94 Proceedings of the 21st annual international symposium on Computer architecture; 1994, 10 pages.*

Gonzalez et al. (A Data Cache with Multiple Caching Strategies Tuned to Different Types of Locality); Proceeding ICS '95 Proceedings of the 9th international conference on Supercomputing; 1995; p. 338-347.*

Sahuquillo et al. (Splitting the Data Cache: A Survey); This paper appears in: Concurrency, IEEE; Issue Date: Jul.-Sep. 2000; vol. 8 Issue:3; on pp. 30-35.*

* cited by examiner

COMPILER ASSISTED LOW POWER AND HIGH PERFORMANCE LOAD HANDLING BASED ON LOAD TYPES

FIELD

This invention relates to the field of memory accesses in computer systems and, in particular, to efficiently performing load operations in processors.

BACKGROUND

Achieving high performance in microprocessors based on hardware techniques usually requires complex structures, which consume relatively high power. The first level data cache is one such structure that epitomizes the contention in processor design between power and performance. For instance, adding an extra read port to a data cache allows multiple loads to be issued in parallel, enhancing performance. However, adding an extra port increases the power consumption and requires complex circuitry.

In the alternative, instead of providing more data cache bandwidth with a brute force manner, a total number data cache accesses may be cut down to conserve power. In some implementations if the number of data cache accesses is substantially reduced, processors with a single read port data cache may perform as well as or close to processors with a two read port data cache without dissipating the extra power.

One way to reduce cache access includes identifying loads that do not require cache access. As a first example, a hardware predictor may be utilized to identify these loads. However, the complex circuitry for a hardware predictor and the power consumption of such logic potentially results in more power consumption.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific processor architecture, pre-fix values, types of loads, sizes of data blocks and corresponding buffers, identification techniques for compilers of producer and consumer loads, etc. in order to provide a thorough understanding of the present invention. It will be apparent, however, to one skilled in the art that these specific details need not be employed to practice the present invention. In other instances, well known components or methods, such as compiler composition, specific compilation techniques, specific logic implementation, and other specific operation details, have not been described in detail in order to avoid unnecessarily obscuring the present invention.

The method and apparatus described herein are for handling compiler assisted low power and high performance loads. Specifically, handling of loads is primarily discussed in reference to a speculative out-of-order microprocessor architecture. However, the methods and apparatus for handling loads are not so limited, as they may be implemented on or in association with any processor system to load from memory, such as an in-order processor system or other architecture processor.

Figure 1:
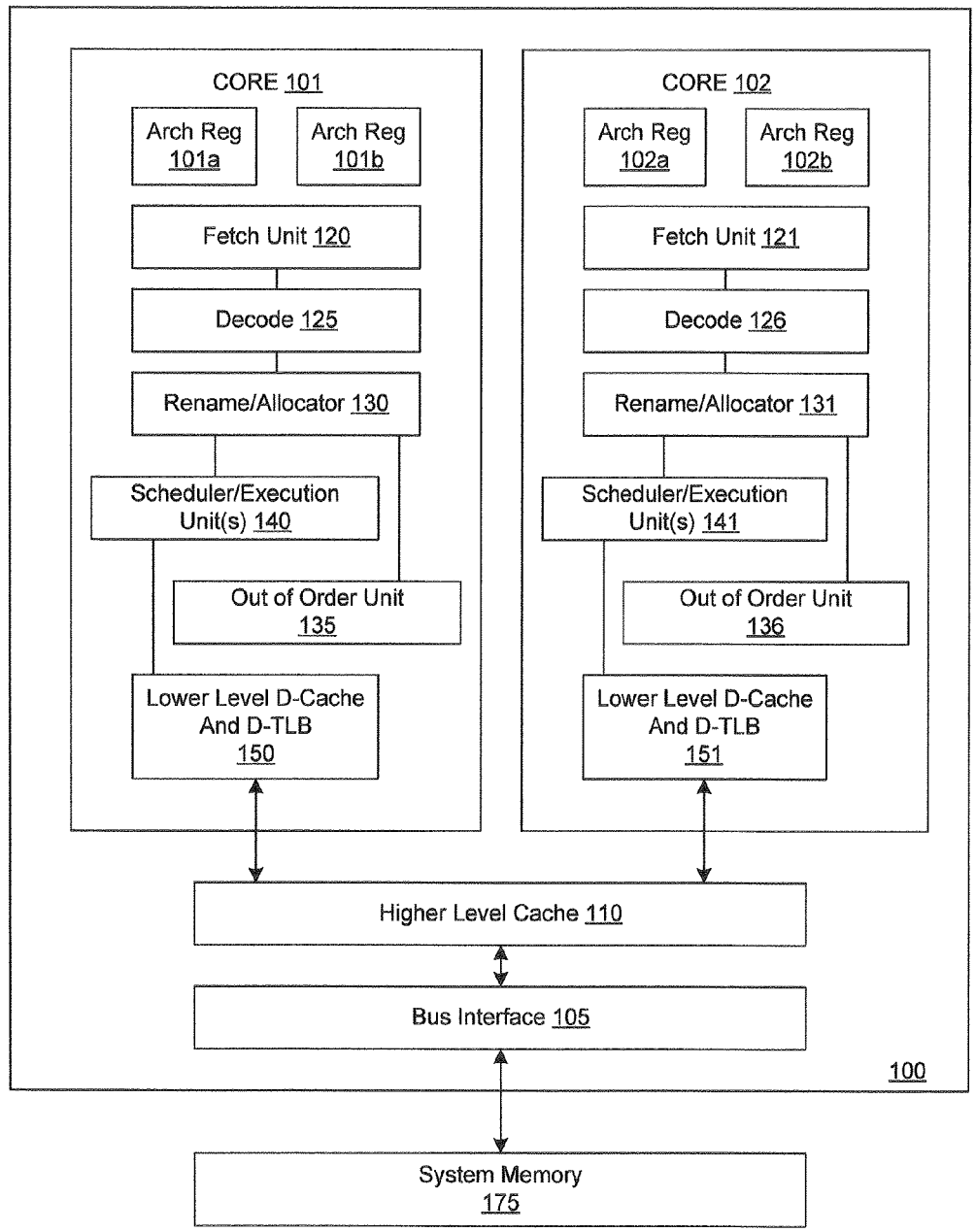
FIG. 1 illustrates an embodiment of a processor including hardware to provide low power efficient handling of load operations.

Referring to FIG. 1, an embodiment of a multi-processing element processor capable of handling compiler assisted low power and high performance load is illustrated. A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources.

Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b, shown in FIG. 1 and referred to herein as architectural state registers, threads, or logical processors. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 (131) may also be replicated for threads 101a and 101b. Some resources, such as re-order buffers in a reorder/retirement unit I-TLB, load/store buffers, and queues may be shared through partitioning. Other resources, such as general purpose internal registers, page-table base register, low-level data-cache and data-TLB 150, scheduler/execution unit(s) 140 (141), and portions of out-of-order unit 135 (136) are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces.

Fetch Unit 120 (121) potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125/126 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one embodiment, machine code instructions to access memory, such as load operations, include a load identifier (ID) field to identify a type of load. Here, a compiler, during compilation of application code, may determine a type of load operation and include a value in the load ID field to indicate the type of load. Examples of types of loads a compiler may identify include a producer load, a consumer load, a forwarded consumer load, a reuse consumer load, and a normal load.

Furthermore, decode module 125, in this embodiment, is capable of decoding the load ID field and identifying the type of load operation. As an example, the decoded load ID may be stored in an instruction cache or trace cache, as described above, along with the decoded instruction information. For instance, assume the load is identified by the load ID field as a producer or consumer load. In response to the load being identified as a producer load, the fetch unit 120, in one embodiment, is capable of fetching multiple blocks of data, i.e. extra data from the data for the producer load is fetched.

As an example, the extra data is placed in a load value buffer, which subsequent consumer loads may access instead of wasting time and power to access a data cache, such as caches 150, 151, or 110. In one embodiment, a consumer load may also load from a store buffer from an in-flight store to read the most current value. As a further illustration, a reuse load versus a forwarded load is distinguishable in the load ID field, and logic is able to direct a consumer load to the correct module/unit without accessing the cache, which results in a high performance load without consuming data cache power.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Allocator and renamer block 130 may also include a register renamer to rename program/instruction reference registers to other registers internal to processor 100. Out-of-order unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operations on execution units. In fact, instructions/operations are potentially scheduled on execution units according to their type availability. Register files associated with the execution units are also included to store instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to scheduler/execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. As stated above, a first level cache may implement the dynamic consumption guided probabilistic allocation policy as described herein.

The processor architecture described above is purely illustrative to depict an exemplary architecture for transfer of states between multiple processing elements. However, any processor architecture, computer architecture, or architectural state may be utilized when saving and/or restoring states, as described herein.

Figure 2:
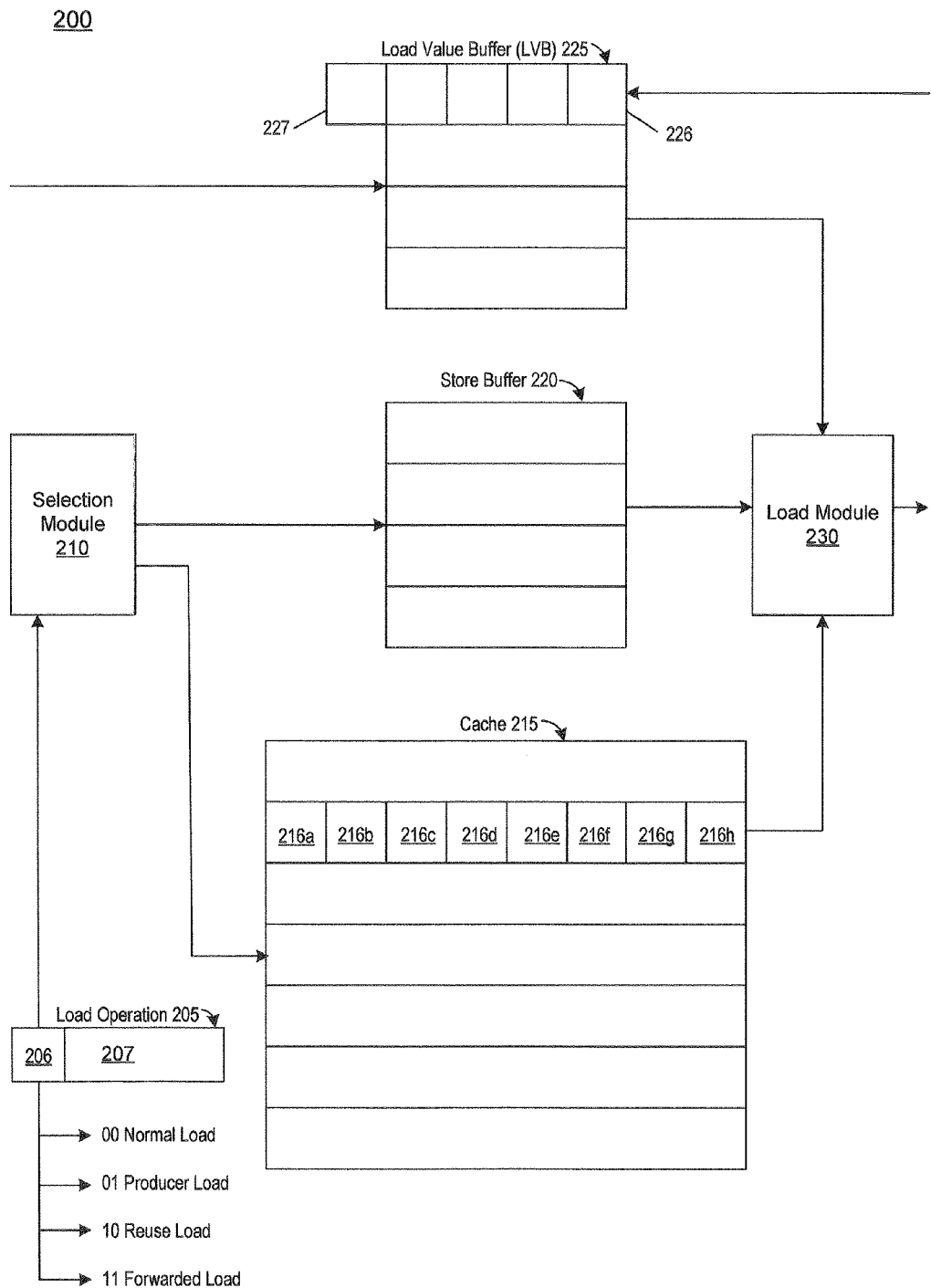
FIG. 2 illustrates an embodiment of logic to provide low power efficient handling of load operations based on a field of load operations.

Referring to FIG. 2, an embodiment of hardware to support handling of low power and high performance loads is depicted. In one embodiment, a hybrid implementation utilizing hardware and software is utilized to identify different types of loads and efficiently handle the loads to conserve power while maintaining performance. For instance, microcode or software, such as application code, a compiler, a parser, or other code, when executed, is capable of identifying different types of loads, while hardware in device 200, which may resemble a processor, is capable of efficiently performing the loads based on software's load type identification.

As stated above, in one embodiment, code, when executed, is to identify types or styles of loads. As an example, the code to identify loads includes a compiler. Often a compiler is used to compile programming language based applications and code into native code recognizable by a processor architecture. As an example, a compiler may compile code into x86 binary code, which is capable of being executed on an Intel Architecture (IA) or other x86 architecture processor. Often during compilation, compilers optimize code, re-arrange code/slices, and insert operations/instructions to take advantage of specific hardware supported features. One such example, includes the ability to handle different types of loads differently to conserve power and maintain performance as described herein.

In one embodiment, a compiler is capable of determining loads that may be performed without accessing a cache to conserve both the cache access time and power consumed when accessing the cache. Also note that a load operation may be part of a larger instruction. For example, x86 instructions sets often include instructions that are decoded into multiple micro-operations. Here, a single micro-operation may be a load operation, where the loaded value is further processed as guided by other instruction related micro-operations. Therefore, a load operation includes any instruction, operation, or micro-operation to load from a memory, such as a cache or other memory device.

In one embodiment, loads are classified into producer loads, consumer loads, and normal loads. Essentially, consumer loads potentially utilize values of previous store operations and/or load operations. Here, consumer loads, as an example, may be differentiated into consumer reuse loads and consumer forwarded loads, which correspond to a consumer load that loads from a previous load and a consumer load that loads from a previous in-flight store, accordingly.

In one embodiment, a consumer reuse load refers to a load operation that is to load a data block, which is the same data block as a previous load. In another embodiment, a consumer reuse load includes a load from a data block loaded by a previous load, as well as a next data block which may be pre-loaded by the previous load. For instance, a previous load performs a load of a referenced block of data for the previous load and additionally loads three additional blocks of data. Here, a consumer reuse load is defined as a subsequent load, which is to load either the referenced block of data or one of the three additional blocks of data. The previous load described above, in one embodiment, is referred to as a producer load. In other words, a load, in which, later consumer loads are to load the same data or other data predicatively loaded, is referred to as a producer load.

As stated above, a consumer load may also include a consumer forwarded load as well. In one embodiment, a consumer forwarded load is similar to a consumer reuse load, except the consumer forwarded load is to load a data block to be written by a previous in-flight store operation, instead of data predicatively loaded by a producer load. For example, a store operation may be in-flight in a store buffer with a new data block for a location, which is the most recent value, i.e. the valid and correct value, to be loaded. As a result, when a load operation is to load from an in-flight store, that load operation is often referred to as a consumer forwarded load.

In one embodiment of a hybrid hardware and software implementation for identifying and handling low power and high performance loads, code, such as a compiler, when executed, is to determine the different types of loads described above and identify them accordingly for hardware to later recognize and handle, accordingly. Essentially, a compiler includes algorithms to determine different loads and method of identifying/tagging those loads for hardware. Therefore, any method of a compiler determining control flows, dependencies, or inserting additional software constructs, such as operations, functions, function calls, and other executable constructs may be utilized in determining and identifying loads as described below. Furthermore, although a compiler is discussed for exemplary purposes to illustrate identification of different types of load operations, any code may be utilized to identify loads as described below.

In one embodiment, a compiler is to determine producer load and consumer reuse load pairs. Note that a producer load, however, may have any number of consumer reuse load pairs. In one embodiment, a producer load and consumer load pair is determined from both a producer load and any number of consumer loads referencing the same address, i.e. the loads intend to load the same data block. In another embodiment, producer load and consumer load pairs are identified or created by a compiler through proximity of load addresses. For example, in one embodiment, a subsequent load is determined to be a consumer load of a previous load, if a data block to be loaded by the subsequent load is within a certain proximity of a data block to be loaded by the previous load.

For instance, assume that cache 215 includes 64 byte cache lines, which holds data in eight readable data blocks, i.e. 216a-216h, of 8 bytes each, and load value buffer 225 includes 32 byte entries, such as entry 226. As a result, when loading from cache line 216 up to 32 bytes may be held in entry 226 of load value buffer 225. As a result, if a first load operation references data block 216e, then any of the three data blocks next to 216e, i.e. 216f-h or 216b-d, may also be loaded and placed in load entry 226, i.e. 32 bytes. As illustrated, data blocks 216e-h are predicatively loaded in performance of the first load operation. As a consequence, any subsequent load that is to load from data blocks 216e-h, which may be held in load value buffer 225, are potentially identified as a consumer load to be paired with the first load as a producer load.

In the example above, predictive loading is discussed in reference to loading a data block and then contiguous data blocks in one direction. However, data blocks may be loaded in any direction, such as a number of blocks before the block to be loaded, i.e. 216b-216e, or a number of blocks on either side of the block to be loaded, i.e. blocks 216c-f. In this example, a direction may be predefined, i.e. load the referenced block and the subsequent next number of blocks, or in the alternative, the direction may be inserted by the compiler to be recognized by hardware.

In one embodiment, other constraints are placed on producer and consumer load pairs. For instance, a number of intervening load operations, inclusion within a same code slice, or a number of load value buffer entries may be constraints. To illustrate, assume load value buffer 225 has sixteen entries. As a result, a maximum of sixteen load entries may be filled in buffer 225 before some entries are evicted or overwritten. Consequently, if there are sixteen identified producer loads between a first producer load and a subsequent load that references the same data block as the first producer load, then, in this example, the subsequent load is not identified as a consumer reuse load to be paired with the first producer load, since the data associated with the producer load may no longer reside in buffer 225.

Furthermore, in one embodiment, a compiler, when compiling application code, is to determine if a load is a consumer forwarded load. Similarly, to a producer load and a consumer load pair, here, a consumer forwarded load and store pair is determined. In one embodiment, a subsequent load, which loads from an address to be written to by a previous store operation, is referred to as a consumer forwarded load. Often, when a consumer forwarded load operation is to load from an in-flight store, the addresses of the store and load are referred to as collision addresses.

However, as above with consumer reuse loads, in one embodiment, other constraints may be provided for a compiler to identify a load as a consumer reuse load. Examples of other factors in determining if a load operation is identified as a consumer forwarded load includes a matching address pair of a store and a load, a size of the store, a size of the load, whether the store and load are in the same code slice, and a number of intervening stores. For example, an extremely aggressive compiler, as in the embodiment above, may identify a subsequent load, which loads from the same address as a previous store, as a consumer forwarded load. However, a more conservative compiler, in one embodiment, identifies a load as a consumer forwarded load if the load is the same size or bigger than a store that references the same address and there are no intervening store operations between the store and the load. As another example, a certain number of stores may be included between the previous store and a consumer forwarded load. For instance, a range of between 0 and the maximum number of store buffer entries may be allowed for the number of intervening stores, based on the level of aggressiveness of the compiler.

Any level of conservative to an aggressive compiler may be utilized in identifying consumer loads. However, in one embodiment, as discussed below, when hardware handles a consumer identified load, either load value buffer 225 or store buffer 220 based on the type of consumer load is accessed without accessing cache 215. As a result, in one embodiment, if the data to be loaded is no longer held in buffers 225 or 220, then the load operation, in one embodiment, is replayed as a normal operation. Often, when an operation needs to be replayed, operations that entered the pipeline have to be flushed, which results in an expensive waste of execution cycles.

Therefore, in one embodiment, the number of factors utilized in determining consumer loads, i.e. how conservative a compiler is in identifying consumer loads, is based on a target percentage of correctly identified consumer loads. For example, if all subsequent loads with the same address as a previous store are identified as consumer loads, the store may be de-allocated from store buffer 220 when data needs to be loaded, which leads to a low identification accuracy. Too low an identification accuracy may potentially lead to a large number of replays, which costs execution cycles. In the alternative, too many constraints potentially leads to very accurate identification, but mitigates the potential positive impact, i.e. power savings, of not identifying true consumer loads. As a purely illustrative example, a range of 80% to 100% for identification accuracy may be targeted to ensure more positive execution cycles are saved by not accessing cache 215 then the number of execution cycles cost replaying mis-identified loads.

In one embodiment, lack of identifying a load as a producer load, a consumer reuse load, or a consumer load results in the compiler identifying a load as a normal load to be performed from cache 215 as normal. Note from above, that depending on the level of aggressiveness of the compiler, some actual producer and consumer loads may be determined not to be such during compilation.

Above, purely illustrative examples of methods, algorithms, and factors for code, such as a compiler, are used to determine if loads are producer or consumer loads. However, any software method for determining if loads are producer or consumer loads may be utilized. Furthermore, in one embodiment, the code, such as a compiler, is to insert values at the load operations to identify them as producer and consumer loads.

A specific illustrative embodiment of a method of identifying loads is illustrated in FIG. 2. Here, portion 206 of load operation 205, which may also be referred to as a type field or load type field, is to identify a type of load operation 205. Note that portion 206 may be located anywhere in load operation 205 or associated in any manner with load operation 205. In one embodiment, portion 206 includes or is included within a pre-fix byte of load operation 205. Here, other information, such as an opcode and referenced address is included in other portion 207 of load operation 205.

As an illustrative example, two bits of portion 206 are utilized to represent a type of load operation 205. Here, a first binary value of 00 (decimal value of zero) represents load operation 205 is a normal load, a second binary value of 01 (decimal value of one) represents load operation 205 is a producer load, a third binary value of 10 (decimal value of two) represents load operation 205 is a consumer reuse load, and a fourth binary value of 11 (decimal value of three) represents load operation 205 is a consumer forwarded load.

In one embodiment, selection module 210 is to direct performance of the load to the correct memory structure, i.e. cache 215, store buffer 220, and load value buffer 225. Selection module 210 is to receive load operation 205 or at least portion 206 of load operation 205 to determine which of the memory structures is to perform the load operation. In one embodiment, decode logic, which may be the same as decode logic to decode instructions or separate decode logic, is to decode portion 206. For instance, decode logic is to mask of the bits of portion 206 and provide them to selection logic, such as a multiplexer, which is to direct performance of the load from the correct memory structure.

In one embodiment, directing performance of a load to one of the structures includes forwarding the load to one of the structures. As another example, selection logic provides a selection signal to a module, such as load module 230 to indicate which structure is to be loaded from. However, selection module 210 in combination with load module 230 includes any logic to select a memory structure to load from and to actually load from that structure.

To illustrate, assume portion 206 includes a pre-fix byte with binary value 10 to indicate load operation 205 is a consumer reuse load. Decode logic masks off those bits and selection logic determines that load value buffer 225 is to be loaded from based on selection logic's determination. Load module 230 associatively searches load value buffer 225 based on an address value associated with load operation 205, such as a tag value. When the correct entry is found, such as entry 226, the correct element is loaded and provided to the correct destination, such as an internal processor register, accordingly.

In one embodiment, in response to portion 206 holding a producer load value, a load from cache 215 is performed. Cache 215 may include any cache, such as an instruction cache, trace cache, data cache, as well as any level of cache. In one embodiment, the data block for the producer load, i.e. a referenced data block, is loaded from cache 215 and a plurality of additional data blocks are also loaded. As an example, a default or predefined number of data blocks that an entry of load value buffer 225 is capable of holding is loaded from cache 215. In another embodiment, load operation 205 includes a field to indicate how many data blocks are to be loaded, what direction they are to be loaded in, etc.

In this embodiment, in response to portion 206 holding a consumer reuse load value, a load from load value buffer 225 is performed without accessing cache 215. As an example, load value buffer 225 includes a plurality of entries with previously loaded data from producer loads. In one embodiment, load value buffer 225 is part of an existing load buffer that tracks current loads. In the alternative, load value buffer 225 is a separate buffer structure to hold producer load data. As illustrated, load value buffer 225 includes entries, such as entry 226, which associated producer loaded data with a tag value in tag field 227. Therefore, when a load is performed from load value buffer 225, here, the entries are associatively searched utilizing tag value to find the correct entry.

As an oversimplified example, assume a first producer load operation is received. From the producer load value in field 206 it is determined that the producer load is to load from cache 215. The producer load references data block 216e in cache line 216. As a result, the predefined amount of data, i.e. four blocks (216e-h) which each entry of load value buffer 225 is capable of holding, is loaded by load module 230 from cache line 216. Load module 230 provides data block 216e to the correct external location, such as an architectural register. Furthermore, data blocks 216e-h are provided to load value buffer 225 and stored in load value buffer entry 226.

Next, a load identified as a consumer reuse load by a compiler is received. Here, the reuse load references data block 216f. Based on the consumer reuse value in field 206 it is determined that the load operation is to read from load value buffer 225. As a result, load value buffer 225 is searched by tag value and data block 216f is loaded from entry 226 by load module 230, which provides data block 216f to the correct data location. Note that no access to cache 215 is made during performance of the consumer reuse load.

In one embodiment, in response to portion 206 holding a consumer forwarded load value, a load from store buffer 220 is performed. In one embodiment, store buffer 220 is similar to existing store buffers that track in-flight store operations. However, here, in contrast to previous methods where cache 215 and store buffer 220 would be searched in parallel, a consumer reuse load is directed to perform the load directly from store buffer 220 without accessing cache 215 in a similar manner as described above in reference to a reuse load from buffer 225.

Figure 3:
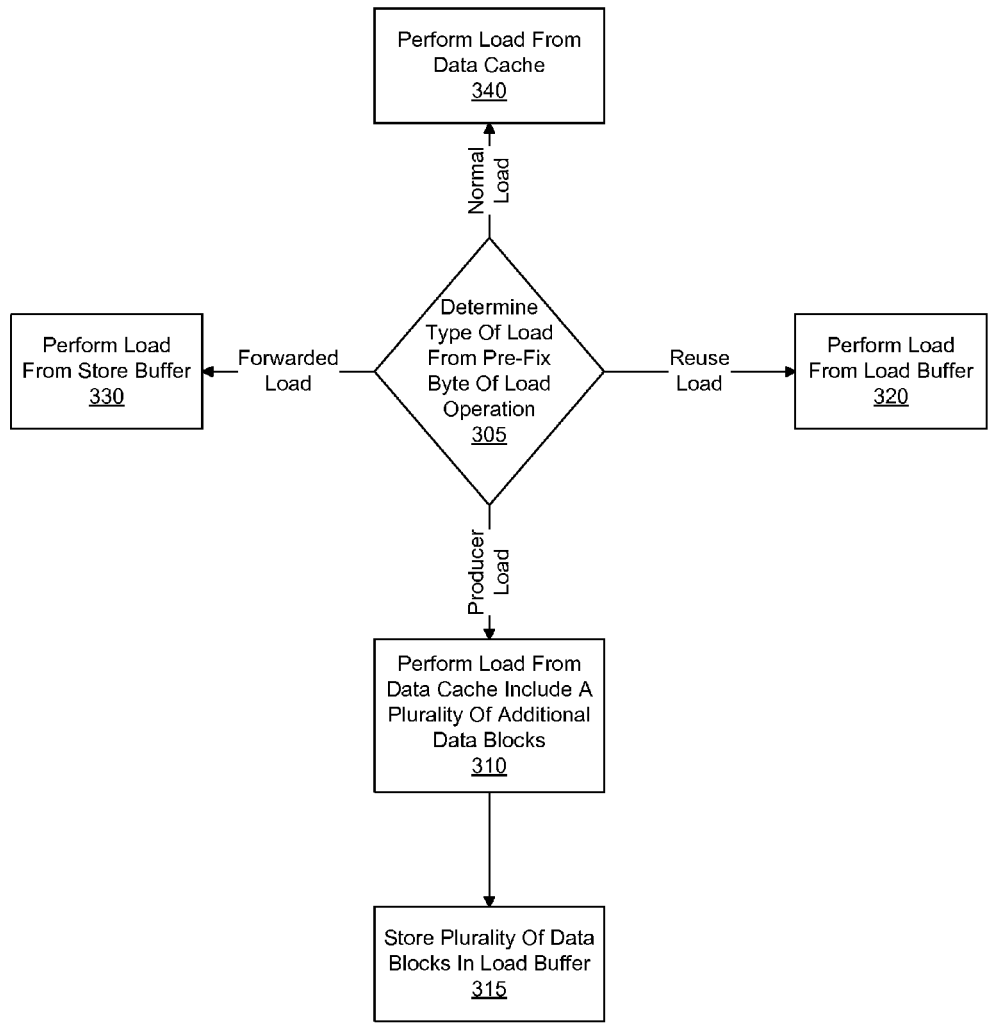
FIG. 3 illustrates an embodiment of a flow diagram for a method of efficiently handling load operations to conserve power.

Turning to FIG. 3, an embodiment of a flow diagram for a method of handling low power and high performance loads is illustrated. In flow 305, it is determining a type of load from a pre-fix byte of a load operation. In accordance with the embodiment described above, software, such as a compiler or executing application, a load type is determined for a load operation. Here, the software includes a value in the pre-fix byte, which is capable of being recognized by hardware, to identify a type of the load. For instance, decode logic masks off the pre-fix byte and the pre-fix byte is utilized to determine the load type.

If the load is determined to be a producer load, then in flow 310 a load from a data cache including a plurality of data blocks is performed. Here, at least one of the plurality of data blocks is a data block to be loaded in performing the producer load, while another data block is a data block to be loaded by a subsequent consumer load not yet encountered. As an example, a predefined number of physical data blocks may be loaded for a producer load. The predefined number potentially corresponds to a size of entries in a load value buffer.

In flow 315, the plurality of data blocks are stored in an entry of a load value buffer. Continuing the example from above, the predefined number of contiguous blocks is stored in a data portion of an entry of the load value buffer and associated with a tag value for the entry. As a result, the physically contiguous blocks are now held in the load value buffer for access by subsequent consumer loads.

Returning to flow 305, if the load is determined to be a consumer reuse load from the pre-fix byte, then in flow 320, the load is performed from the load value buffer. To illustrate, the load value buffer is associatively searched based on tag values and the correct entry of the load value buffer is determined. As a result, the consumer reuse load is directly performed from the load value buffer, i.e. high performance, without wasting power accessing a data cache, i.e. low power.

In contrast, if the load is determined to be a consumer forwarded load, then in flow 330, the load is performed from a store buffer. Similar to above, the store buffer is searched and the appropriate value/data block is loaded. As noted above, if an entry for a consumer load does not exist in the load value buffer or store buffer, the load is to be replayed as a normal load, i.e. the data cache is accessed. In one embodiment, the pre-fix byte held associated with the operation in a trace cache or other storage logic is ignored by selection logic and a normal load is performed. In contrast, the pre-fix byte may be overwritten with a normal value. Therefore, whether through replay or through initial determination that the load is a normal load, the load is performed normally in flow 340 from a data cache.

As can be seen from above, a hybrid hardware and software system may efficiently identify producer and consumer loads, as well as handle them maintaining high performance while conserving power. Complex and expensive hardware logic to identify producer and consumer loads dynamically may be avoided through use of software, such as a compiler, to identify load types. Furthermore, compilers may be tweaked to any level of aggressiveness in identifying loads to ensure an accuracy level. As a result, selection logic is able to directly load from an appropriate memory structure, and in specific cases, is able to avoid data cache accesses.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a cache memory to store data;
    a retirement unit to retire instructions, the retirement unit including:
        a load value buffer to store data loaded from the cache memory;
        a store buffer to store data of in-flight store operations;
    hardware decode logic to decode a portion of a load operation and receive and provide a second portion of the load operation to a selection logic; and
    the selection logic coupled to the hardware decode logic to receive the second portion of the load operation, determine which of the load value buffer, the store buffer and the cache memory from which to perform the load operation based on the second portion of the load operation, and direct performance of the load operation to load data from:
        the load value buffer in response to a first value of the second portion of the load operation;
        the store buffer in response to a second value of the second portion of the load operation, and
        the cache memory in response to a third value of the second portion of the load operation.

2. The processor of claim 1, further comprising load logic to load a block of data referenced by the load operation and a plurality of other blocks of data into the load value buffer in response to the second portion of the load operation holding a fourth value to indicate the load operation is a producer load.

3. The processor of claim 2, wherein the load logic is to load the block of data and the plurality of other blocks of data from the cache memory, the plurality of other blocks of data including a plurality of contiguous blocks of data, and wherein the load value buffer is to include an entry to hold a tag value associated with at least the plurality of contiguous blocks of data after the load logic loads the plurality of contiguous blocks of data from the cache memory.

4. The processor of claim 1, wherein the selection logic is to direct performance of the load operation to load data from the load value buffer in response to the second portion of the load operation holding the first value to indicate the load operation is a consumer reuse load, and without searching any other memory structure in parallel with the load value buffer.

5. A method comprising:
    determining, in a selection logic of a processor, if a load operation referencing an address is a consumer forwarded load based on a load type value, held in a load type field of the load operation, having a second value, the selection logic receiving the load type value from a decoder that decodes a portion of the load operation and receives the load type field;
    directing the load operation, via the selection logic, to a store buffer without searching any other memory structure in parallel with the store buffer in response to determining the load operation is a consumer forwarded load, the store buffer including a store buffer entry holding data associated with the address;
    determining, in the selection logic, if the load operation referencing the address is a consumer reuse load based on the load type value, held in the load type field of the load operation, having a first value; and
    directing, via the selection logic, the load operation to a load value buffer without searching any other memory structure in parallel with the load value buffer in response to determining the load operation is a consumer reuse load, the load value buffer including a load value buffer entry holding data associated with the address, wherein the load value buffer entry including the data was loaded responsive to a previous load operation referencing a different address present in a cache line including the data of the load value buffer entry.

6. The method of claim 5, further comprising:
    determining, in the selection logic, if the load operation referencing the address is a normal load based on the load type value, held in the load type field of the load operation, having a third value; and
    directing the load operation, via the selection logic, to a data cache in response to determining the load operation is a normal load.

7. The method of claim 6, further comprising:
    determining if a store buffer entry holds data associated with the address; and
    replaying the load operation as a normal load in response to determining the store buffer entry does not hold data associated with the address.

* * * * *